Figure 1:
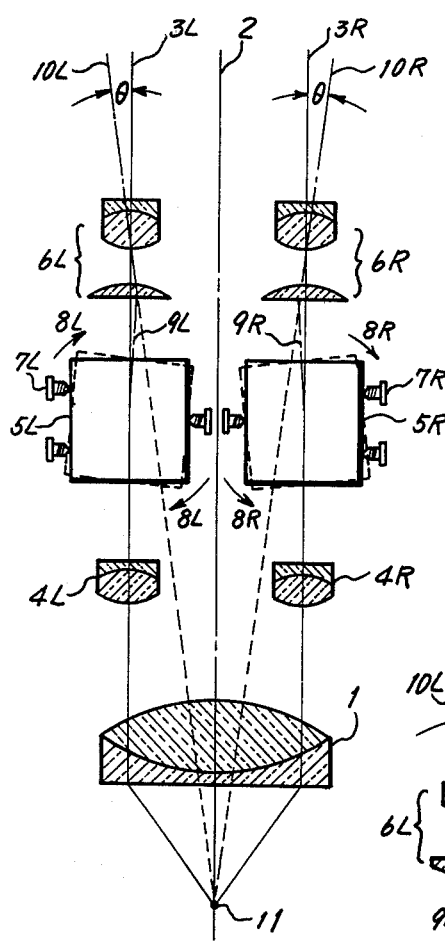

United States Patent [19]
Abe et al.

[11] 4,009,526
[45] Mar. 1, 1977

[54] BINOMIAL MICROSCOPE

[75] Inventors: Kuniomi Abe, Kobe; Yuji Maekawa, Nishinomiya, both of Japan

[73] Assignee: Konan Camera Research Institute, Japan

[22] Filed: Sept. 30, 1975

[21] Appl. No.: 618,278

[30] Foreign Application Priority Data

Apr. 24, 1975 Japan .............................. 50-56683

[52] U.S. Cl. ................................. 350/35; 350/139
[51] Int. Cl.[2] ......................................... G02B 21/22
[58] Field of Search .................. 350/33, 35, 75, 76, 350/134, 145

[56] References Cited

UNITED STATES PATENTS 3,434,772  3/1969  Fogle ................................... 350/35

FOREIGN PATENTS OR APPLICATIONS 907,679  10/1962  United Kingdom ................. 350/35

Primary Examiner—Edward S. Bauer
Assistant Examiner—Matthew W. Koren
Attorney, Agent, or Firm—Eugene E. Geoffrey, Jr.

[57] ABSTRACT

A binomial microscope having a pair of optical systems with parallel axes, each system including an objective lens, an erect prism and an ocular lens so that the observed image is in the vicinity of the object to be observed.

1 Claim, 4 Drawing Figures

BINOMIAL MICROSCOPE

This invention relates to an improved binomial microscope and more particularly to an improved structure therefor.

There are two types of binomial microscopes, one having a pair of microscopes arranged with their optical axes intersecting in the vicinity of the object, while the other is arranged with parallel optical axes. The former type has the disadvantage that is is difficult to assemble through the parallax between the both eyes is unchanged even in case of repeated alternation of direct observation by the naked eyes and microscopic observation. Contrarily, the latter one has the disadvantage that the observer is fatigued by the parallax between the both eyes varying between the two modes of observation, although it can be easily assembled.

Accordingly, an object of this invention is to provide an improved binomial microscope which can be easily assembled and also can form as observed image in the vicinity of the object to be observed.

This object can be attained in accordance with this invention by providing a microscope which comprises an auxiliary objective arranged in the rear of the object to be observed and a pair of optical systems having substantially parallel optical axes and being arranged in the rear of the auxiliary objective and with each optical system including an objective, an erect prism, an ocular and an adjusting mechanism for moving the erect prism.

This and other objects and operations of this invention will be described in detail hereinunder with reference to the accompanying drawings.

Figure 2A:
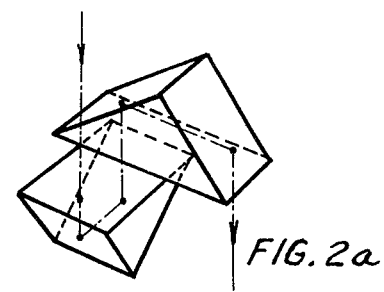
Figure 3:
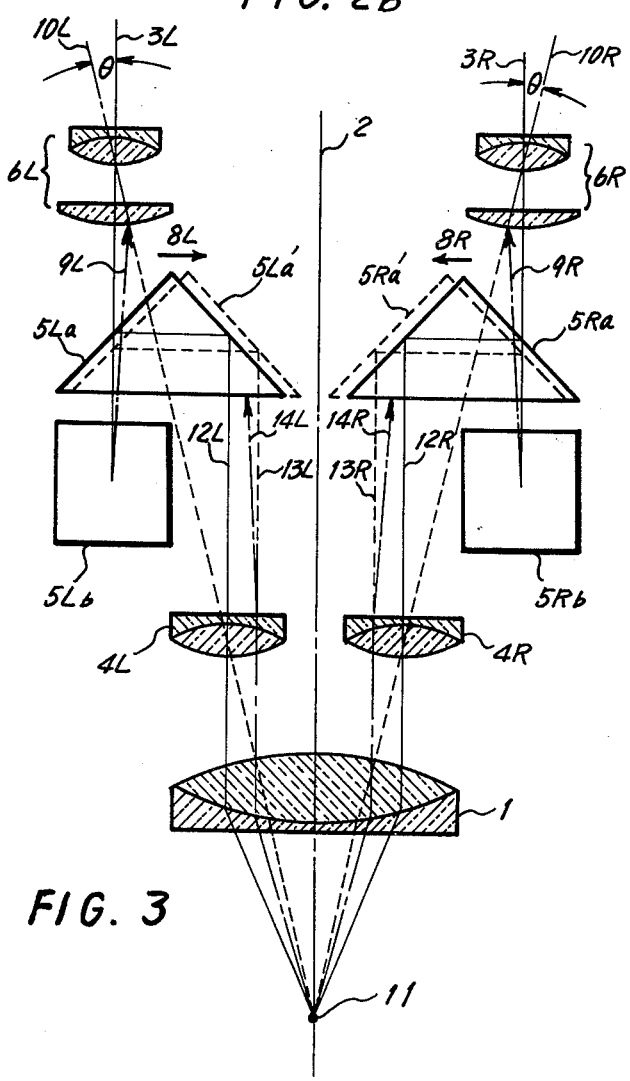

In the drawings:

FIG. 1 is a schematic diagram representing a structural configuration of an embodiment of binomial microscope according to this invention;

FIGS. 2(a) and (2b) are perspective view representing two examples of the erect prism of FIG. 1; and FIG. 3 is a schematic diagram representing a structural configuration of another embodiment of a binomial microscope according to this invention.

Throughout the drawings, same reference numerals are used to denote corresponding structural components and suffixes L and R are added thereto for distinguishing both optical systems.

In FIG. 1, the binomial microscope includes an auxiliary objective 1 having an optical axis at the front end. Along a pair of optical axes 3L and 3R which are parallel with and symmetrical about the optical axis 2, there is arranged a pair of optical systems respectively comprising objectives 4L and 4R, erect prisms 5L and 5R and ocular 6L and 6R arranged in that order as shown.

Figure 2B:
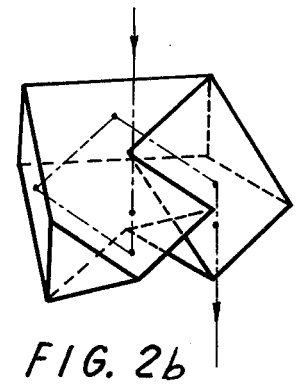

Though the erect prisms 5L and 5R are shown as blocks in the drawing, these blocks illustrate the casings of the erect prisms and the prisms themselves may be of any any type which are well known in this field. FIGS. 2(a) and 2(b) represent two typical examples of erect prisms, which are known as Porro Types I and II respectively. The casings of the erect prisms 5L and 5R are supported by screws 7L and 7R which are supported by the casings of both optical systems (not shown), and can be rotated in the directions of arrows 8L and 8R by adjusting the screws 7L and 7R. The rotations of the erect prisms 5L and 5R effect declinations of their optical axes as shown by broken lines 9L and 9R and consequently effect declinations of the optical axes of the both optical systems as shown by broken lines 10L and 10R.

When the declinations of the erect prisms 5L and 5R are small, the declination angle θ between the apparent optical axes 10L and 10R and the reference optical axes 3L and 3R is also small and an observed image is formed at a position far from the object 11 to be observed. However, if the support screws 7L and 7R are adjusted to adequately rotate the erect prisms 5L and 5R, the apparent optical axes 10L and 10R can intersect at or near the object 11 to be observed, thereby forming the observed image at or near the object 11.

Although the whole assembly of each erect prism was rotated in the above description, it should be apparent that one of the component prisms may be rotated in order to obtain the same effect if the erect prism assembly consists of two component prisms as shown in the example of FIG. 2(a).

The embodiment of FIG. 3 differs from that of FIG. 1 in that the erect prisms 5L and 5R are of Porro Type I of FIG. 2(a) and consist respectively of pairs of rectangular prisms 5La and 5Lb and 5Ra and 5Rb and that only the prisms 5La and 5Ra are arranged for movement in the directions of arrows 8L and 8R respectively.

If the rectangular prisms 5La and 5Ra are moved to the dashed positions 5La' and 5Ra' as shown, the optical axes of the respective erect prism assemblies vary from full lines 12L and 12R to dashed lines 13L and 13R and the beams incident in the objectives 4L and 4R along these new optical axes 13L and 13R refract out in broken line directions 14L and 14R respectively. This results in opposite declinations of the optical axes 9L and 9R of the erect prisms as in the case of FIG. 1 and consequently in similar declinations of the apparent optical axes 10L and 10R of the both optical systems. As the declination angle θ is a function of displacement of the prism 5La or 5Ra, the observed image can be formed at or near the object 11 by adjusting the displacement of the both prisms 5La and 5Ra.

Although only the prisms 5La and 5Ra were moved in the above description, it should be apparent that the same effect can be obtained by moving the whole prism assemblies including also the prisms 5Lb and 5Rb.

Based upon the above-mentioned principle, the binomial microscope of this invention includes means for moving at least a part of the erect prism assemblies, thereby realizing such a binomial microscope which can form an observed image at or near the object to be observed, regardless of parallel arrangement of its reference optical axes. Although the moving means was described above as a screw mechanism, it should be understood that various mechanisms may be applied for this purpose.

What is to be claimed is:

1. A binomial microscope comprising an auxiliary objective and a pair of optical systems having substantially parallel optical axes and being arranged in the rear of said auxiliary objective, each of said optical systems including an objective, an erect prism and an ocular, and said optical system further includes means for moving at least a part of said erect prism while the remaining optical components remain fixed, whereby the observed image can be positioned in the vicinity of the object being observed.

* * * * *